United States Patent
Moonan

[11] 3,822,976
[45] July 9, 1974

[54] ICE CREAM SCOOP
[76] Inventor: Edward R. Moonan, Boonville, N.Y. 13309
[22] Filed: Aug. 27, 1973
[21] Appl. No.: 391,943

[52] U.S. Cl. .............................. 425/286, 425/281
[51] Int. Cl. .............................................. A23g 5/02
[58] Field of Search .......... 425/278, 279, 281, 284, 425/286, 221, 187

[56] References Cited
UNITED STATES PATENTS
1,450,886  4/1923  Heimerdinger .................... 425/281
2,178,648  11/1939  Rothenbush ...................... 425/278
2,752,631  7/1956  Wendt ............................ 425/286 X

*Primary Examiner*—J. Spencer Overholser
*Assistant Examiner*—David S. Safran

[57]  ABSTRACT

An ice cream scoop having a trowel-like cylindrical end portion and a plunger moveable in said portion for ejecting the food product inserted therein. The plunger is semicircular in configuration and is held from rotation by a special expedient in order to assure the operability and efficiency of the plunger in causing such ejection.

2 Claims, 3 Drawing Figures

PATENTED JUL 9 1974  3,822,976

ICE CREAM SCOOP

The invention relates to ice cream scoops and in particular to such devices of the plunger type.

Ice cream scoops employing plungers to dispense the ice cream are known. See, for example, U.S. Pat. No. 2,615,405. The problem of dispensing the ice cream after the scoop is dipped into the tubs where the ice cream is stored is noted therein, particularly where the product is hard. The invention disclosed herein contemplates an ice cream scoop of the cutter type shown in U.S. Pat. No. 2,178,648 in which there is, however, a plunger for the dispensing purpose. Because the cutter end is semi-cylindrical, as opposed to cylindrical in cross section, the plunger is correspondingly shaped. It is, therefore, made imperative that the plunger be non-rotable in order to assure the maximum efficiency of the dispensing operation. The invention here resides in the provision of a special means to that end.

One object of the invention is to provide a cutter type ice cream scoop having improved means for dispensing the food product.

Other objects and advantages of the invention will be apparent on reading the following description of one embodiment thereof which is taken in conjunction with the accompanying drawings, in which.

Figure 1:
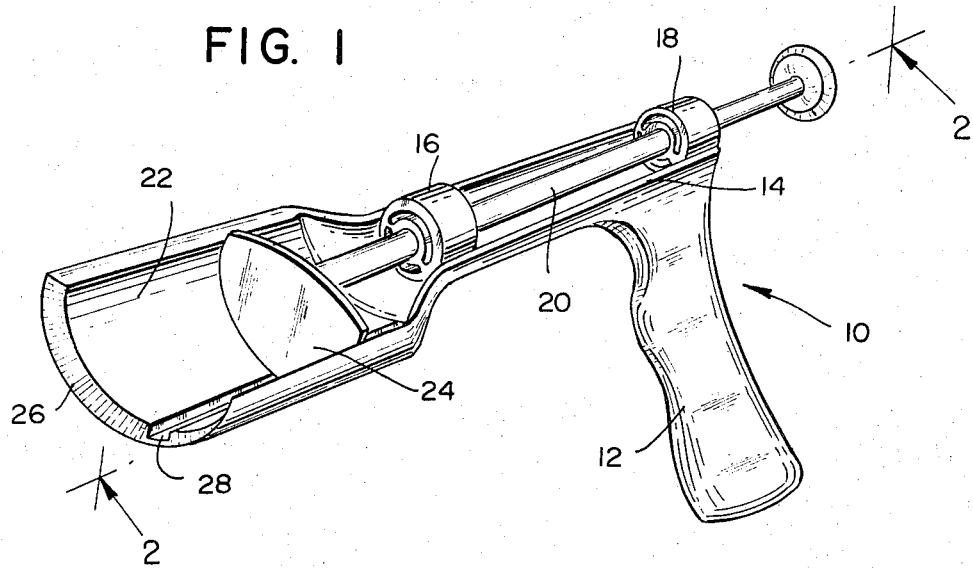
FIG. 1 is a view in perspective of the ice cream scoop.
Figure 2:
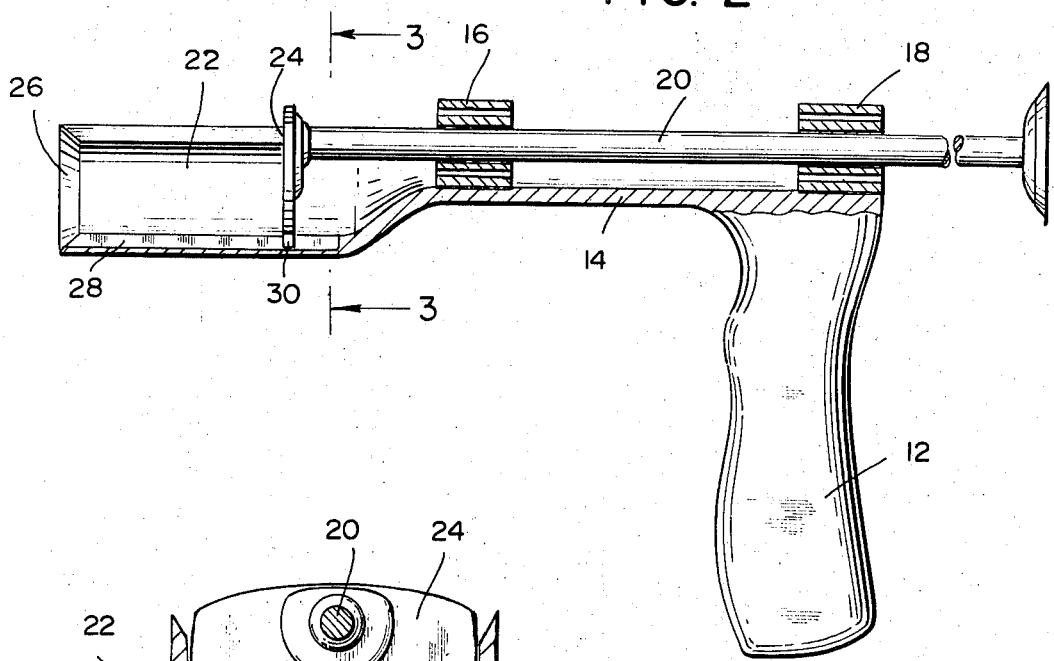
FIG. 2 is an elevation of same.
Figure 3:
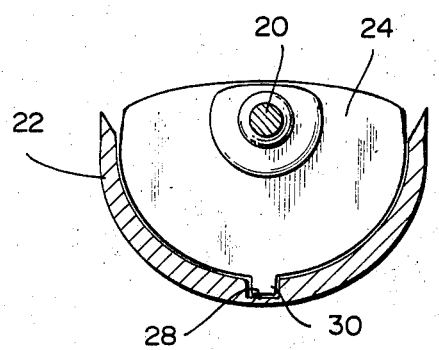
FIG. 3 is a section taken on the line 3—3 of FIG. 1.

Referring to the drawings the ice cream scoop 10 has a handle 12 terminating in an open trough portion 14. A pair of bushings 16 and 18 is securely disposed in the respective end portions of the trough 14.

Plunger rod 20 is mounted in said bushings and has secured to its end within trowel portion 22 of the scoop a plunger 24 which is semi-circular in cross section the top thereof being flush with the side edges of the scoop in the portion 22. The terminal edge of the portion 22 is bevelled at 26 to enhance its cutting capacity.

There is disposed in the bottom of the portion 22 a shallow slot or groove 28 in which there is disposed a tongue 30 extending the entire length of the portion 22 passing through a hole or recess formed in the periphery of the plunger.

In operation, the scoop is merely dipped into the ice cream tub and the portion 22 is thereby filled with the ice cream. By placing thumb pressure on the end of the rod 20, the ice cream is dispensed in the quantity desired.

Various modifications of the invention may be effected by persons skilled in the art without departing from the scope and principle thereof as defined in the appended claims.

What is claimed is:

1. An ice cream scoop having a trough portion and a trowel portion, said trowel portion being semi-circular in cross section, a plunger similarly semi-circular in cross section disposed in said trowel portion, a plunger rod extending through and beyond said trough portion terminating in said plunger and mounted in bushings disposed in said trough portion and means for preventing rotation of said plunger.

2. An ice cream scoop as defined in claim 1 wherein said means comprise a tongue extending the length of said trowel portion passing through said plunger at a point not in alignment with said rod.

* * * * *